June 2, 1970  B. H. GROVER  3,514,936
BERRY HARVESTER

Filed Oct. 18, 1967  3 Sheets-Sheet 1

INVENTOR
BLANCHARD H. GROVER

BY Browne, Schuyler & Beveridge

ATTORNEYS

June 2, 1970

B. H. GROVER 3,514,936

BERRY HARVESTER

Filed Oct. 18, 1967

INVENTOR
BLANCHARD H. GROVER

BY Browne, Schuyler & Beveridge

ATTORNEYS

June 2, 1970 B. H. GROVER 3,514,936
BERRY HARVESTER

Filed Oct. 18, 1967 3 Sheets-Sheet 3

INVENTOR
BLANCHARD H. GROVER

BY Browne, Schuyler & Beveridge
ATTORNEYS

United States Patent Office 3,514,936
Patented June 2, 1970

3,514,936
BERRY HARVESTER
Blanchard H. Grover, Vincentown, N.J., assignor to Holly Hydraulics, Inc., a corporation of New Jersey
Filed Oct. 18, 1967, Ser. No. 676,239
Int. Cl. A01g 19/00
U.S. Cl. 56—330                                                6 Claims

ABSTRACT OF THE DISCLOSURE

A berry harvester is provided with plural sets of elongated shaker rods which extend into a vine. The shaker rods are oscillated simultaneously in opposite horizontal directions to shake berries from the vine. A tray beneath the shaker rods catches the fallen berries.

---

This invention relates to apparatus for harvesting berries by shaking berry-laden vines to cause the berries to fall onto a gathering surface such as a tray. Although the apparatus is intended primarily for use in connection with blueberries, it may also be used for harvesting other agricultural products which may be dislodged from low-growing plants by shaking.

Berry harvesting machines which utilize laterally movable rods for engaging and shaking a vine are not new. A device of this type is the subject of U.S. Pat. 2,586,834 which issued on Feb. 26, 1952 to Peter P. Kreisman, Jr. In this previous apparatus, the parallel vine-engaging rods are movable exclusively in a vertical direction. Such movement has a tendency to break stems and branches from the vine and to disturb the root structure of the vine. This prior art machine also is adapted to move continuously along a row of vines so that movement of the supporting vehicle will tend further to strip away portions of the bearing vine.

The present invention has several characteristics which render it highly useful in the harvesting of berries and superior to the aforementioned prior art machines. This harvesting machine, like the prior art, employs a plurality of parallel rods which extend into a vine and are moved in order to shake the vine and dislodge berries. One distinction between this invention and the prior art is that the shaker rods in this invention are movable in a generally horizontal direction so that their oscillation does not tend substantially to break portions of the vine during the shaking process. Furthermore, this does not disturb the vine's root structure.

Another feature employed in this invention is that there are plural sets of shaker rods which are vertically disposed from each other and which are moved in opposite directions in order to produce a violet shaking of the entire vine including those portions of the vine above and below the sets of parallel shaker rods.

The harvesting machine of the invention is also superior to the prior art in that the movable parallel rods are supported on a carriage in a manner which facilitates their movement from one vine to another. The vine shaker assembly is mounted on a frame which moves parallel to the rows of vines, and the shaker assembly is mounted so that it may be projected laterally in a direction generally perpendicular to the row of vines so that the rods will engage individual vines arranged in the particular row being harvested.

From the foregoing remarks, it will be appreciated that a principal object of the invention is to provide an agricultural harvesting machine adapted to the harvesting of berries which is capable of shaking a vine in order to remove berries without causing substantial destruction of the vine due to the breaking of the vine's branches.

Another object is to provide a relatively simple mechanism having few moving parts and being capable of efficiently shaking a vine while using a relatively small amount of power.

Still another object is to provide a berry harvesting machine in which plural parallel shaker rods are supported on a ground-traversing carriage in a manner which facilitates engagement of the shaker rods with individual vines as the carriage is moved to various stations alongside a row of vines.

Additional advantages and objects of the invention will be recognized from an inspection of the specification and of the drawings which represent but two possible embodiments of the invention. Numerous other variations and modifications are contemplated within the spirit of this invention.

In the drawings

Figure 6:
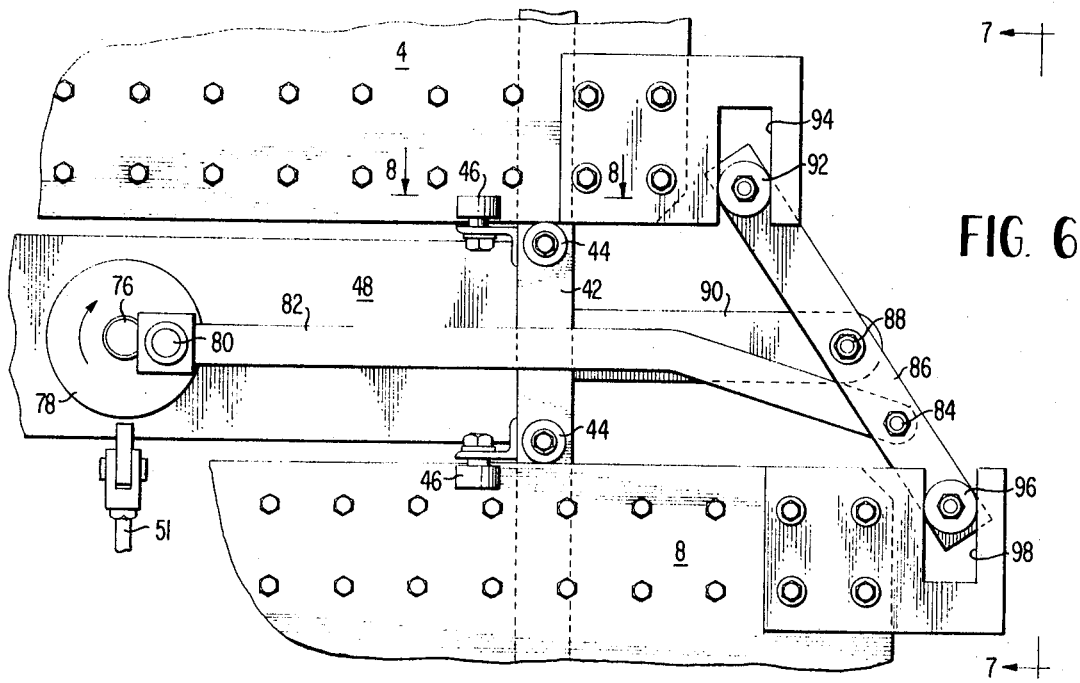
FIG. 6 is a detail view of the mechanism used for moving the shaker rods in the machine constructed in accordance with the FIG. 1 embodiment.
Figure 8:
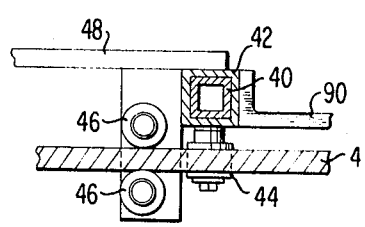
Figure 9:
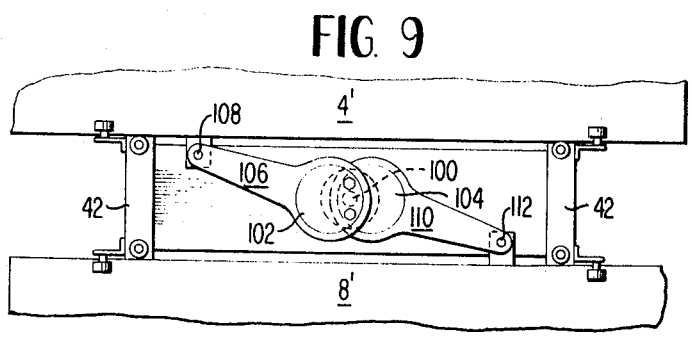
Figure 7:
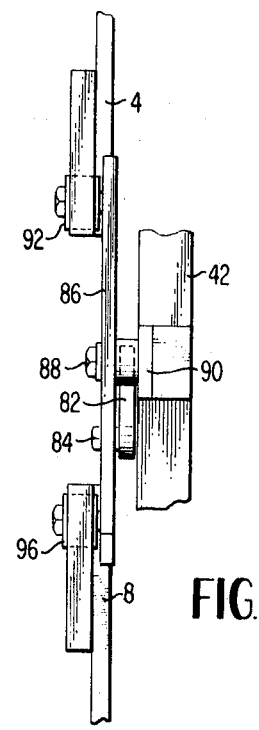
Figure 10:
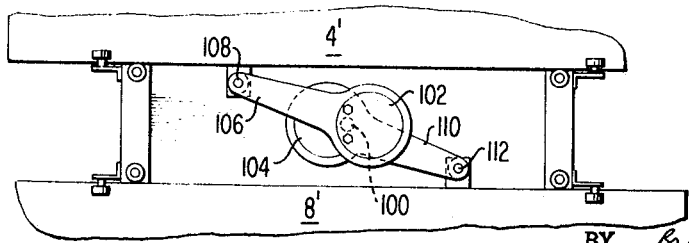

FIG 7 and FIG. 8 are views taken along the lines 7—7 and 8—8 respectively in FIG. 6; and FIGS. 9 and 10 are elevational views of a modified mechanism for moving the vine-shaking rods.

Figure 1:
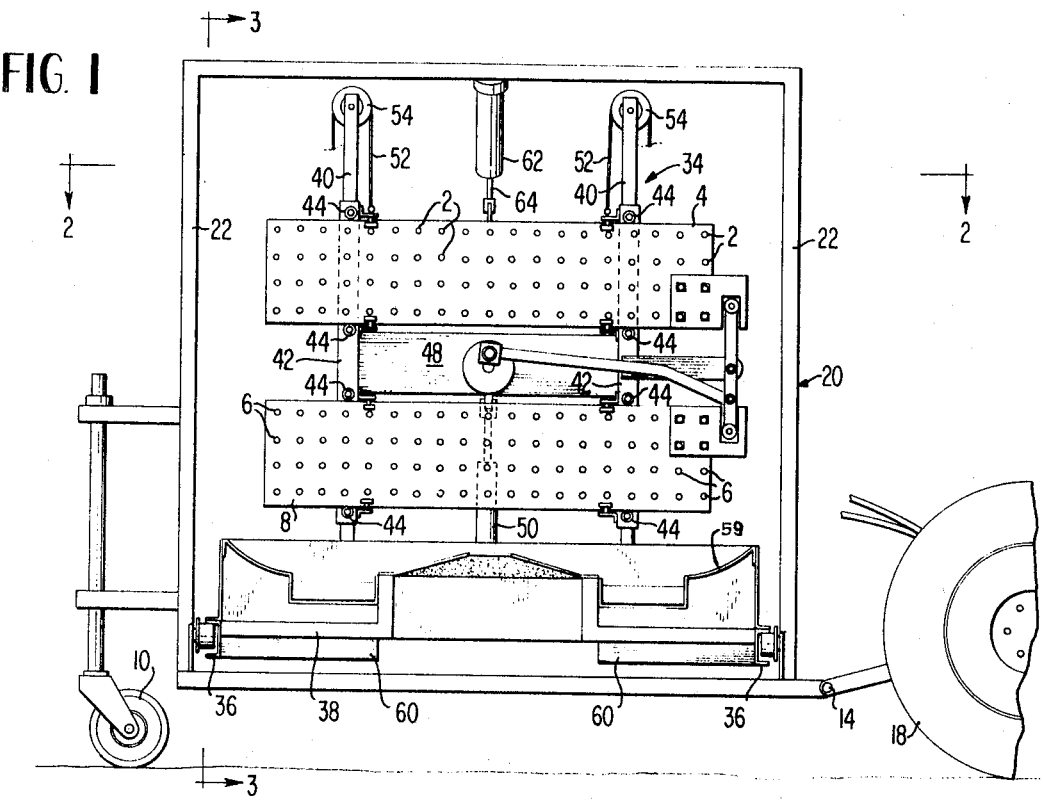
FIG. 1 is a side elevation of a harvesting machine made in accordance with the invention.
Figure 2:
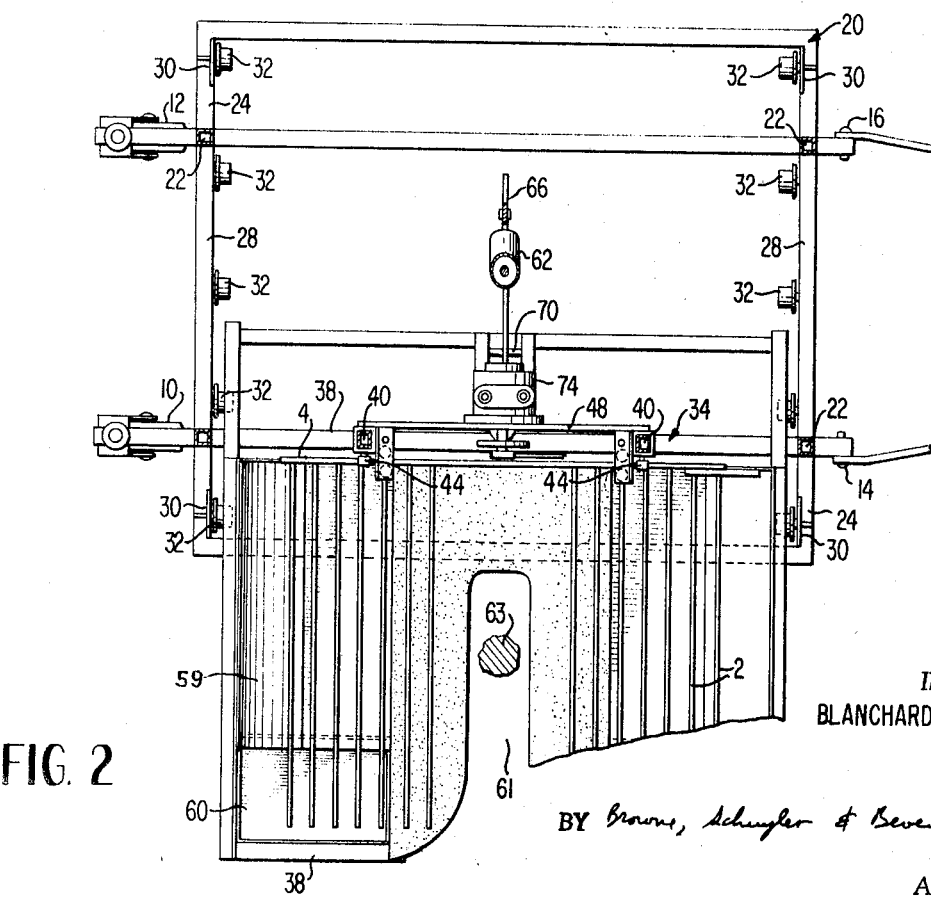
FIG. 2 is a plan view of the harvesting machine of FIG. 1, partially in section taken along the line 2—2 in FIG. 1, showing the vine-shaking rods laterally extended from their supporting frame.
Figure 3:
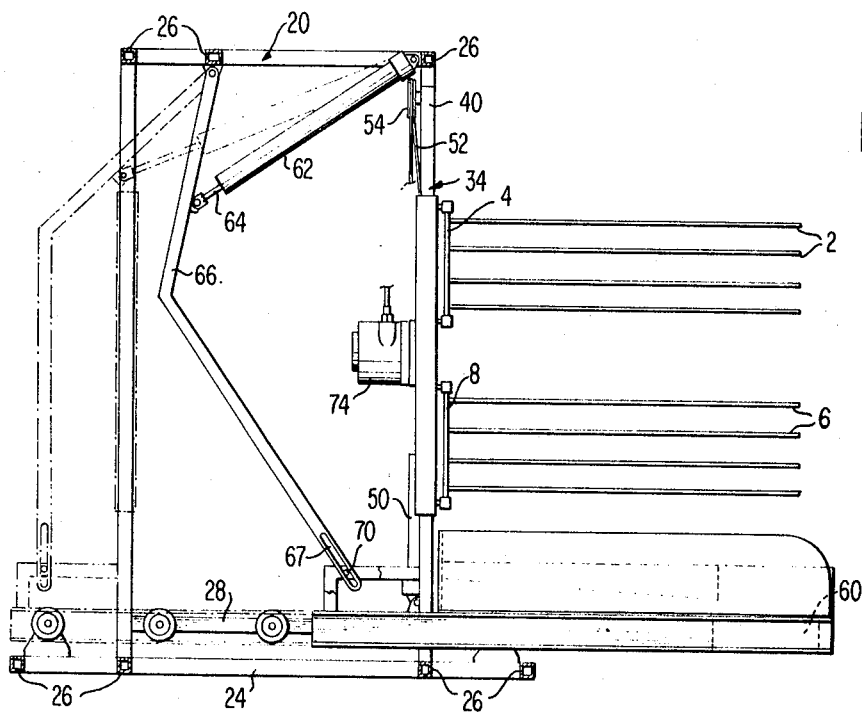
FIG. 3 is a rear elevation of the machine of FIG. 1 as seen along the line 3—3 in FIG. 1, showing the shaker rods laterally extended.
Figure 4:
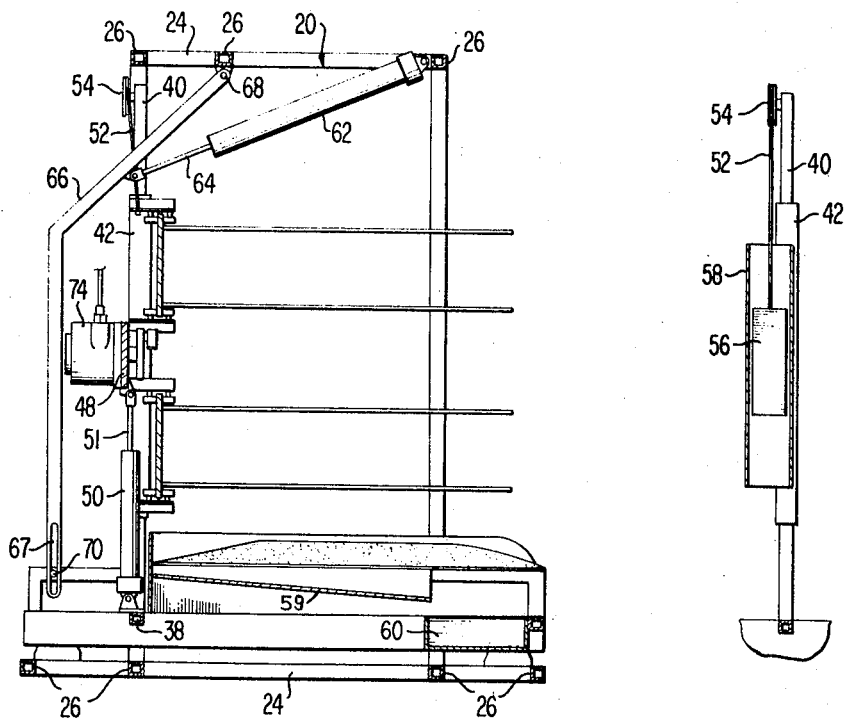
FIG. 4 is a view similar to FIG. 3, but showing the shaker rods retracted.

In the illustrated apparatus, the vine shaking elements are a plurality of parallel shaker rods which are moved in a prescribed path in order to shake a vine. In FIGS. 1–3, a plurality of these shaker rods 2 are connected to a horizontally movable vertical plate 4. Another set of shaker rods 6 are mounted on a lower plate 8 which is moved to shake that portion of a vine through which the rods 6 project. The elements 2, 4, 6 and 8 form portions of a vine shaker assembly which is supported on a frame having rear ground-traversing caster wheels 10 and 12 and forward pivotal connectors 14 and 16 which attach to a rearwardly-extending hitch on a tractor or other traction vehicle. The rear wheel of a tractor is indicated at 18. The supporting frame, generally designated 20 is movable with the traction vehicle 18 along a path generally parallel to a row of vines or other plants. This frame includes four vertical beams 22, four transverse horizontal beams 24 and seven longitudinal horizontal beams 26, the latter of which are best shown in FIGS. 3 and 4. The frame also has transverse members 28 shown in FIG. 3 which, together with brackets 30, support a plurality of rollers 32 which rotate about axes parallel to the direction of movement of the frame 20.

The purpose of the rollers 32 is to permit movement of the shaker assembly designated generally 34 in a direction which is transverse to the direction of movement of the frame 20. Such movement of the shaker assembly projects the shaker rods 2 and 6 laterally into the vines preparatory to the shaking operation.

The laterally movable vine shaker assembly 34 has a pair of C-beams 36 shown best in FIG. 1 which form trackways to receive the rollers 32 and permit lateral movement of the shaker assembly 34. These beams 36 are innerconnected by the beams 38 as shown in FIG. 2. A pair of upstanding vertical post members 40 are secured on the innermost one of the beams 38.

The rod-supporting plates 4 and 8 are supported on sliding tubular members 42 which encircle and move vertically along the vertical post members 40. These sliding tubular members 42 are of non-circular cross section to prevent them from rotating with respect to their respective vertical post members 40. Each of the sliding tubular members 42 carries a plurality of rollers which form trackways to support and align the plates 4 and 8. Some of these rollers, designated 44, are located vertically above and below the horizontal edges of the plates 4 and 8. The rollers 46 are located to ride on the vertical faces of the plates 4 and 8 in order to maintain the plates in their vertical orientation. A plate-like member 48, shown in FIG. 1, connects to both of the sliding tubular members 42.

When operating the machine of this invention, it is sometimes useful to adjust the vertical position of the rods 2 and 6 due to the height of the vines or other operating conditions. Such vertical adjustment is accomplished by actuating the hydraulic cylinder 50 which is shown best in FIG. 4. The cylinder 50 is anchored to the beam 38 and has an actuating rod 51 connected to the plate member 48 so that any extension or retraction of the rod 51 of cylinder 50 will cause the plate member 48 and the sliding tubular members 42 to move vertically along the post members 40, carrying with them the shaker rods and other elements.

Figure 5:
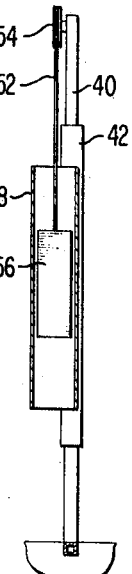
FIG. 5 is a detail view of a counterweight used in conjunction with vertical adjustment of the shaker rods.

In order to reduce somewhat the power requirements of the hydraulic cylinder 50, the vertically movable assembly is counterweighted. Flexible cables 52 are attached to the brackets which support the uppermost pair of rollers 46. These cables pass over pulleys 54 and then descend to a point where the counterweight is located. As shown in FIG. 5, the counterweight 56 is supported within a tube 58 on the vertical post member 40. The purpose of the tube 58 is to prevent the counterweight 56 from swinging excessively during operation of the machine.

Another element which is attached to the vine shaker assembly and which is movable horizontally therewith is a stainless steel tray 59 which lies beneath the rods 2 and 6 in order to catch any berries which are shaken from a vine. The tray has an open-ended slot 61 which permits it to surround a bush which is shown in FIG. 2 at 63. The sides of the slot 61 may be of flexible resilient material such as rubber to prevent damage to the bush or vine. The sides of the tray are inclined downwardly and outwardly from the carriage in order to cause the berries to move toward and into the boxes located at 60.

FIGS. 3 and 4 best illustrate the structure which moves the rods 2 and 6 horizontally from their position within the outer frame 20 to their extended vine-engaging position. This actuating means simply involves a hydraulic cylinder 62 which is anchored at its upper end to the frame 20 and connected at its lower end through rod 64 to an arm 66 which is mounted on the frame 20 at 68. The lower end of the arm 66 is slotted at 67 to receive a bolt 70 on the shaker assembly. When the rod 64 is extended from the cylinder 62 as shown in FIG. 4, the arm 66 swings in a clockwise direction, thus retracting the shaker rods 2 and 6 from engagement with a vine.

The rotary hydraulic motor designated 74 in FIGS. 2-4 is used to impart motion to the plates 4 and 8 and to the rods 2 and 6. The driving linkages are best understood from FIG. 6 where the shaft of the motor 74 is shown at 76. A disc 78 is keyed to the shaft and carries an eccentric connection 80. An arm 82 is pivotally attached to the eccentric connection 80 so that it will oscillate upon rotation of the motor. The opposite end of the arm 82 is pivotally connected at 84 to a lever arm 86. The arm 86 pivots about a connector 88 on a bracket 90 which is cantilevered from a sliding tubular member 42. At the upper end of the lever arm 86, a roller 92 is operatively connected to the upper plate 4 by riding in a slot 94 in the upper plate 4. In a similar manner, the lower end of the arm 86 has a roller 96 which rides in a slot 98 in the lower plate 8. Of course, this arrangement results in the continuous oscillation of the arm 86 and the consequent simultaneous movement of the plates 4 and 8 in opposite horizontal directions.

A suitable amplitude of movement for the plates 4 and 8 is eight inches if the machine is used in blueberry harvesting operations. The rotational speed of the motor 74 and the resulting frequency of oscillation of the plates 4 and 8 may be adjusted throughout a wide range by an operator who controls the flow of hydraulic fluid to the motor from a pump or other pressure source. The exact frequency used will vary with the type and maturity of the harvested produce.

In instances when it is unnecessary to use as many shaker rods as are shown in FIGS. 1–3, some of the rods may be removed from their supporting apertures in the plates 4 and 8. FIG. 4 shows a shaker assembly with only two rows of rods on each plate. The locations of rods 2 and 6 are such that the shortest distance between any rod on the plate 4 and any rod on the plate 8 is a distance at least as great as the maximum relative movement between the two sets of rods during operation of the machine, measured along the paths of movement of the rods. In the described embodiment, then, the lower row of rods on plate 4 is at least eight inches from the upper row of rods on plate 8.

An alternative means for horizontally moving the plates 4 and 6 in opposite directions is shown diagrammatically in FIGS. 9 and 10 where the motor shaft is designated 100. A pair of circular members 102 and 104 are keyed to the shaft 100 and mounted eccentrically to the axis of rotation of the shaft 100. A connecting rod 106 has a bearing which encircles the circular member 102, and an opposite end portion which is pivotally connected to the upper plate 4' at the point 108. In a like manner, a connecting rod 110 is connected to the member 104 and to the lower plate 8' at point 112. FIG. 10 merely shows the structure of FIG. 9 at an opposite point of rotation of the shaft 100 in order to illustrate that the plates 4' and 8' are continuously moved in opposite directions.

As stated previously, the invention may assume various forms other than those shown in the foregoing description. Regarding the rods 2 and 6, it is preferable that their movement be exclusively horizontal, but any path of movement having substantial horizontal components is acceptable. The machine may operate successfully with only one of the plates 4 or 8, although the cooperation between the plates as they move in opposite directions has decided advantages. The rods 2 and 6 are preferably advanced toward the vine along a linear path parallel to the rods, but other paths of movement may be devised within the spirit of this invention.

The operation of the machine will readily be understood from the foregoing description. The traction vehicle and the frame 20 are moved in a direction parallel to a row of vines and are stopped when the rods 2 and 6 are axially aligned with a vine. Then, with the sets of rods aligned vertically as shown in FIG. 1, the hydraulic cylinder 62 shown in FIG. 3 is actuated to extend the rods into the vine. Rotation of the motor 74 is then commenced in order to move the sets of shaker rods and shake the vine. This shaking results in the falling of the berries or other produce onto the collection tray 60.

It is understood that the preceding description is only for illustrative purposes, and that various modifications to this apparatus may be accomplished without departing from the spirit of this invention.

I claim:

1. A berry harvesting machine comprising a vine shaker assembly with a plurality of generally horizontal cantilevered parallel rods, a frame, a pair of roller trackways on said frame, a pair of vertical plates each attached to a set of said rods and supported in said trackway for exclusive horizontal movement, a pivotally mounted arm having each of its opposite end portions operatively connected to a different one of said plates whereby said plates move in opposite directions, and actuating means including a motor and linkage means, said linkage means connecting said motor and said arm for repeatedly moving said rods in a path which has directional components which are generally horizontal and perpendicular to their longitudinal axes.

2. The berry harvesting machine of claim 1 in which said arm is pivotally mounted at its midportion on said frame.

3. The berry harvesting machine of claim 2 in which each of said vertical plates has a plurality of horizontal rows of openings, each opening for receiving therein an individual one of said rods.

4. The berry harvesting machine of claim 1 in which all of said plurality of rods are attached to said vertical plates.

5. A berry harvesting machine comprising a vine shaker assembly having a plurality of generally horizontal mounted cantilevered parallel rods, a frame, a pair of trackways on said frame, a pair of vertical plates each attached to a set of said rods and supported in said trackway for exclusive horizontal movement of said plates and all of said plurality of mounted rods, a pair of connecting rods having one end of each rod operatively connected to a different one of said plates, and actuating means including a motor with eccentric connections, said eccentric connections coupled between said motor and said connecting rods for moving said plates in opposite directions whereby all of said plurality of mounted rods are repeatedly moved in a path which has directional components which are generally horizontal and perpendicular to their longitudinal axes.

6. The berry harvesting machine of claim 5 in which each of said vertical plates has a plurality of horizontal rows of openings, each of said openings being adapted for receiving an individual one of said rods.

References Cited

UNITED STATES PATENTS

| | | | |
|---|---|---|---|
| 2,586,834 | 2/1952 | Kreisman | 56—328 |
| 3,023,565 | 3/1962 | McKibben et al. | 56—330 |
| 3,389,543 | 6/1968 | Clark | 56—337 |
| 3,401,514 | 9/1968 | Clark | 56—328 |
| 3,418,797 | 12/1968 | Meyerhoffer | 56—328 |

ROBERT PESHOCK, Primary Examiner

J. A. OLIFF, Assistant Examiner